United States Patent Office 3,063,121
Patented Nov. 13, 1962

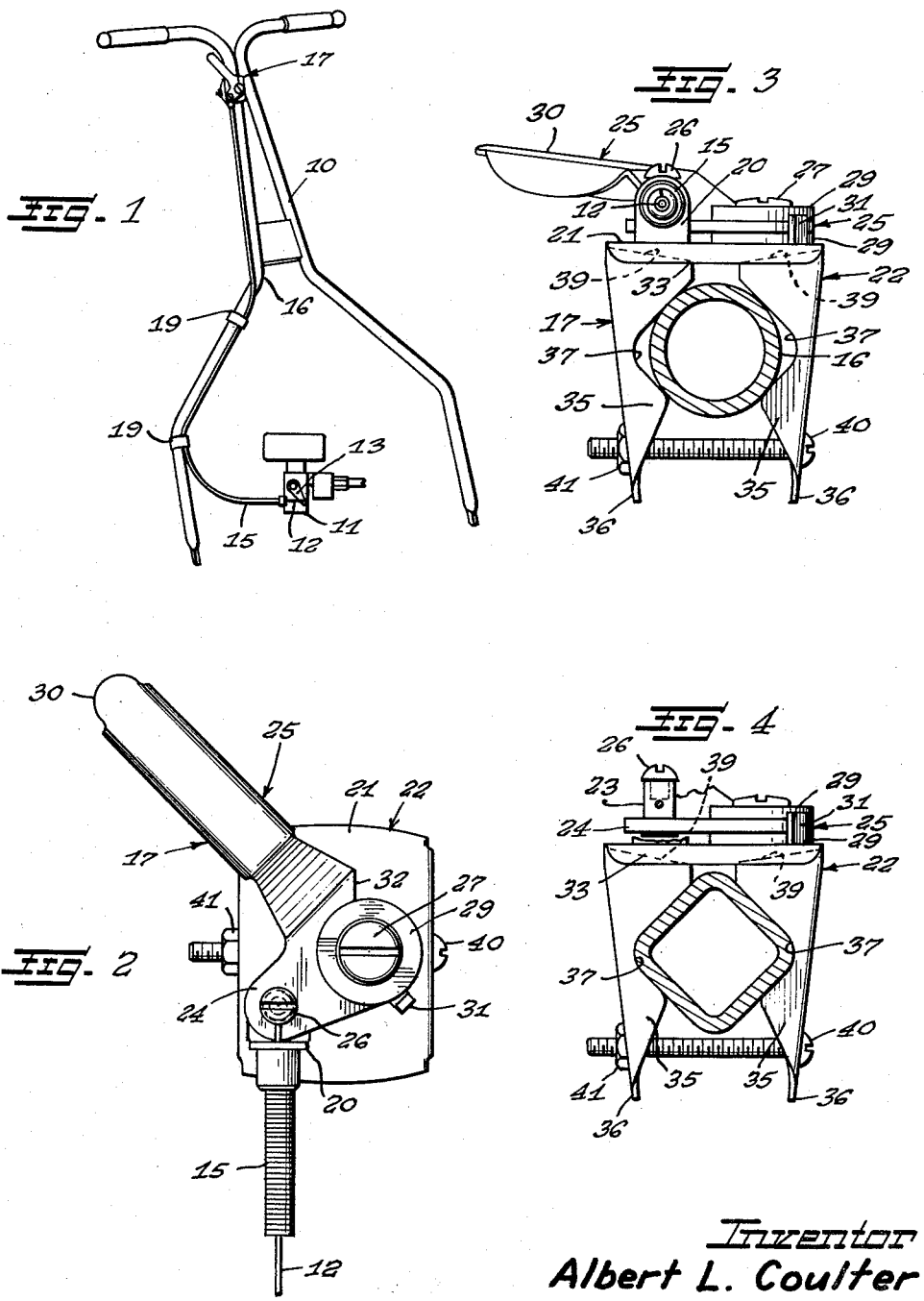

3,063,121
CLAMP ON THROTTLE CONTROL
Albert L. Coulter, P.O. Box 436, Commercial Road,
Crystal Lake, Ill.
Filed Oct. 14, 1959, Ser. No. 846,363
1 Claim. (Cl. 24—243)

This invention relates to improvements in throttle controls and more particularly relates to an improved clamp on throttle control for lawn mowers and the like.

A principal object of the invention is to provide a throttle control adapted for lawn mowers and the like enabling the speed of the lawn mower to readily be controlled from the handle of the lawn mower.

A further object of the invention is to provide a universal clamp-on control for lawn mowers and the like adapted to fit various sizes and cross-sections of lawn mower handles.

A still further object of the invention is to provide a simple from of clamp-on throttle control for lawn mowers and the like arranged with a view toward simplicity and economy in construction and manufacture and universal adaptability to various forms of lawn mower handles.

These and other objects of the invention will appear from time to time as the following specification proceeds and with reference to the accompanying drawings, wherein:

FIGURE 1 is a perspective view of a lawn mower handle having the throttle control of the invention clamped thereon and diagrammatically showing the control connected with the throttle lever of a lawn mower carburetor;

FIGURE 2 is a top plan view of the throttle control shown in FIGURE 1;

FIGURE 3 is a section taken through a lawn mower handle showing the throttle control of the invention in end view; and FIGURE 4 is a view somewhat similar to FIGURE 3, with certain parts broken away and showing the throttle control having clamping engagement with a rectangular lawn mower handle.

In the embodiment of the invention illustrated in the drawing, I have shown in FIGURE 1 a handle 10 for a power lawn mower (not shown) and the like, and have diagrammatically shown a carburetor 11 for the engine (not shown) of the lawn mower, having a flexible cable or Bowden wire 12 pivotally connected to the end of a throttle lever 13 for operating the same to vary the speed of the lawn mower engine. The Bowden wire 12 is guided within a flexible cable guide 15 extending upwardly along a bar 16 of the lawn mower handle to a throttle control 17 constructed in accordance with the invention. The cable guide 15 is shown as being clipped to the bar 16 by clips or straps 19 and as being connected at its upper end to a support ear 20 punched upwardly from a top plate 21 of a clamp 22 for the throttle control. The Bowden wire 12 is shown as extending through a collar 23 extending upwardly from and pivotally mounted on a lever arm 24 of a throttle control level 25, and as being secured to said collar as by a screw 26 threaded into clamping engagement with the Bowden wire 12.

The throttle control lever 25 is pivotally mounted on the upper face 21 of the clamp 22 on a pivot member in the form of a machine screw 27, extending through friction washers 29, which may be nylon washers, on opposite sides of the throttle control lever 25, and through said throttle control level and the top surface or plate 21 of the clamp 22. The machine screw 27 may be threaded in a nut (not shown) on the inner side of the plate or flat outer surface 21, to exert sufficient pressure on the friction washers 29 to hold the throttle control lever 25 in position when the hand is removed from a hand lever 30 of said throttle control lever. A stop ear 31 is pressed outwardly from the plate 21 to engage a shouldered portion 32 of the throttle control lever 25, and limit pivotal movement thereof in a direction to open the throttle for the carburetor 11.

Referring now in particular to the clamp 22, said clamp may be a stamping stamped from a flat blank and perforated to punch the lug 20 and ear 31 therefrom, and to form a hole for the machine screw 23 to pass therethrough. The clamp 22 may be formed by a first blanking and punching operation, a second pressing or stamping operation, turning down opposite end portions of the plate 21 as indicated by reference character 33 to stiffen the flat outer surface of the plate and to bend flanges 35 inwardly along opposite sides of legs 36 for the clamp. The legs 36 may then be bent downwardly to form the clamp into the general form of a U.

The flanges 35 have generally V-shaped grooves 37 formed therein, adapted to engage opposite sides of the bar 16, which may be round, as shown in FIGURE 3, or which may be generally rectangular as shown in FIGURE 4, or which may be of various other shapes in cross-section, such as triangular. The upper faces of the flanges 35 are inclined with respect to the bottom of the face or plate 21, as indicated by reference character 39, to accommodate the clamp to clamp into engagement with various sizes of lawn mower handles without altering the clamp. The flanges 35 are clamped into engagement with the bar 16 as by a machine screw 40, loosely extending through the legs 36 and having a nut 41 threaded thereon, to draw the legs 36 together and clamp the flanges 35 into engagement with the handle of the lawn mower.

It may be seen from the foregoing that the throttle control of the invention enables the speed of the engine of a lawn mower to be readily controlled from the handle of the lawn mower and that it consists merely in a clamp adaptable to round handles of various diameters and to handles of various cross-sections, and forming a support for the hand throttle lever 25, as well as the cable guide for the Bowden wire connected from the hand throttle lever of the carburetor for the engine of the lawn mower.

While I have herein shown and described one form in which invention may be embodied, it may be understood that various variations and modifications in the invention may attained without departing from the spirit and scope of the novel concepts of the invention as defined by the claim appended hereto.

I claim as my invention:

A clamp particularly adapted for detachably supporting a clamp-on throttle control on the handle of a motor driven device comprising a flat sheet of metal having a first pair of spaced parallel approximately right angled inwardly turned bends forming a flat plate and a pair of confronting legs extending normally from opposite sides of said plate, each of said legs having a pair of parallel approximately right angled inwardly turned bends about axes normally intersecting the bend forming said leg and forming a pair of flanges extending toward the other leg of said clamp, each of said flanges having a generally V-shaped notch confronting the other leg of the clamp, the notches being aligned for engaging the handle, the flanges having straight edges extending from the intersection of the bend between said flange and the leg thereof and the bend between the leg of said flange and the plate, said edges of the flanges being at an acute angle to the plate, said flat sheet having a second pair of approximately right angled, spaced, inwardly turned bends normal to the first pair of bends and forming the edges of the plate between the first pair of bends, said second pair of bends forming a pair of stiffening flanges, and each of said stiffening flanges extending to cover that portion of the surface of the flanges of the legs disposed adjacent to the edge of the plate formed by the bend of said stiffening flange, and a member attached to each of the legs remote from the plate for urging the legs toward each other.

References Cited in the file of this patent

UNITED STATES PATENTS

| | | |
|---|---|---|
| 632,858 | Waibel | Sept. 12, 1899 |
| 1,281,800 | Lustig | Oct. 15, 1918 |
| 1,462,725 | Swan | July 24, 1923 |
| 1,711,730 | Gibson | May 7, 1929 |
| 1,963,908 | Manasek | June 19, 1934 |
| 2,537,322 | Wanzenberg | Jan. 9, 1951 |
| 2,551,636 | Ratigan | May 8, 1951 |

FOREIGN PATENTS

| | | |
|---|---|---|
| 162,387 | Great Britain | Apr. 28, 1921 |
| 700,936 | Great Britain | Dec. 16, 1953 |